(12) United States Patent
Huang

(10) Patent No.: US 8,859,914 B1
(45) Date of Patent: Oct. 14, 2014

(54) DIGITAL SCALE WITH REMOVABLE INSERT

(76) Inventor: Kerry Zhi Huang, Diamond Bar, CA (US)

( * ) Notice: Subject to any disclaimer, the term of this patent is extended or adjusted under 35 U.S.C. 154(b) by 281 days.

(21) Appl. No.: 13/472,268

(22) Filed: May 15, 2012

(51) Int. Cl.
*G01G 21/28* (2006.01)

(52) U.S. Cl.
USPC .......................................... 177/126; 177/238

(58) Field of Classification Search
CPC ...................................................... G01G 21/28
USPC .................................. 177/126, 127, 238–244
See application file for complete search history.

(56) References Cited

U.S. PATENT DOCUMENTS

| | | | | |
|---|---|---|---|---|
| 379,746 | A * | 3/1888 | Watt | 177/127 |
| 409,080 | A * | 8/1889 | Watt | 177/127 |
| 2,528,619 | A | 11/1950 | Stein | |
| 2,750,184 | A * | 6/1956 | Warndahl | 177/127 |
| 3,321,036 | A * | 5/1967 | Keenan et al. | 177/245 |
| 4,210,216 | A * | 7/1980 | Godden | 177/134 |
| 4,676,327 | A * | 6/1987 | Luechinger | 177/126 |
| 5,044,453 | A * | 9/1991 | Bankier et al. | 177/25.16 |
| 5,613,304 | A * | 3/1997 | Lin | 34/90 |
| 6,590,166 | B2 * | 7/2003 | Yoshida | 177/126 |
| 6,608,261 | B2 * | 8/2003 | Thadani | 177/126 |
| 6,781,068 | B2 * | 8/2004 | Zahriya et al. | 177/127 |
| 6,891,113 | B2 * | 5/2005 | Fringeli et al. | 177/238 |
| 8,148,651 | B1 * | 4/2012 | Coppola | 177/25.16 |
| 8,344,271 | B1 * | 1/2013 | Falk, Jr. | 177/126 |
| 8,517,618 | B2 * | 8/2013 | Cartwright et al. | 400/613 |
| 2008/0245580 | A1 * | 10/2008 | Aby-Eva et al. | 177/25.12 |

FOREIGN PATENT DOCUMENTS

| | | | | |
|---|---|---|---|---|
| JP | 2008-116222 | * | 5/2008 | G01G 21/28 |
| JP | 2008-116224 | * | 5/2008 | G01G 21/28 |

OTHER PUBLICATIONS

Machine translation of JP 2008-11622 from the JPO website, Apr. 18, 2014.*

* cited by examiner

*Primary Examiner* — Randy W Gibson

(57) ABSTRACT

The present invention is a digital scale having an outside housing that generally is supported from a support surface from a horizontal surface, where the outside housing preferably encloses a microprocessor operating under a control program and is at least connected to a power supply, a sensors/load cell unit, an input/output unit, and a user interface with a display. The sensors/load cell unit is operatively connected with a weighing surface plate, upon which may directly receive to an upper surface an item which will be weighed or which may engage other intervening plates or containers which ultimately support an item to be weighed. The outside housing defines an opening in a bottom, side or top surface which provides access to an adjunct tools container which lies, in a stored position, completely or mainly, within a form factor of the outside housing.

6 Claims, 6 Drawing Sheets

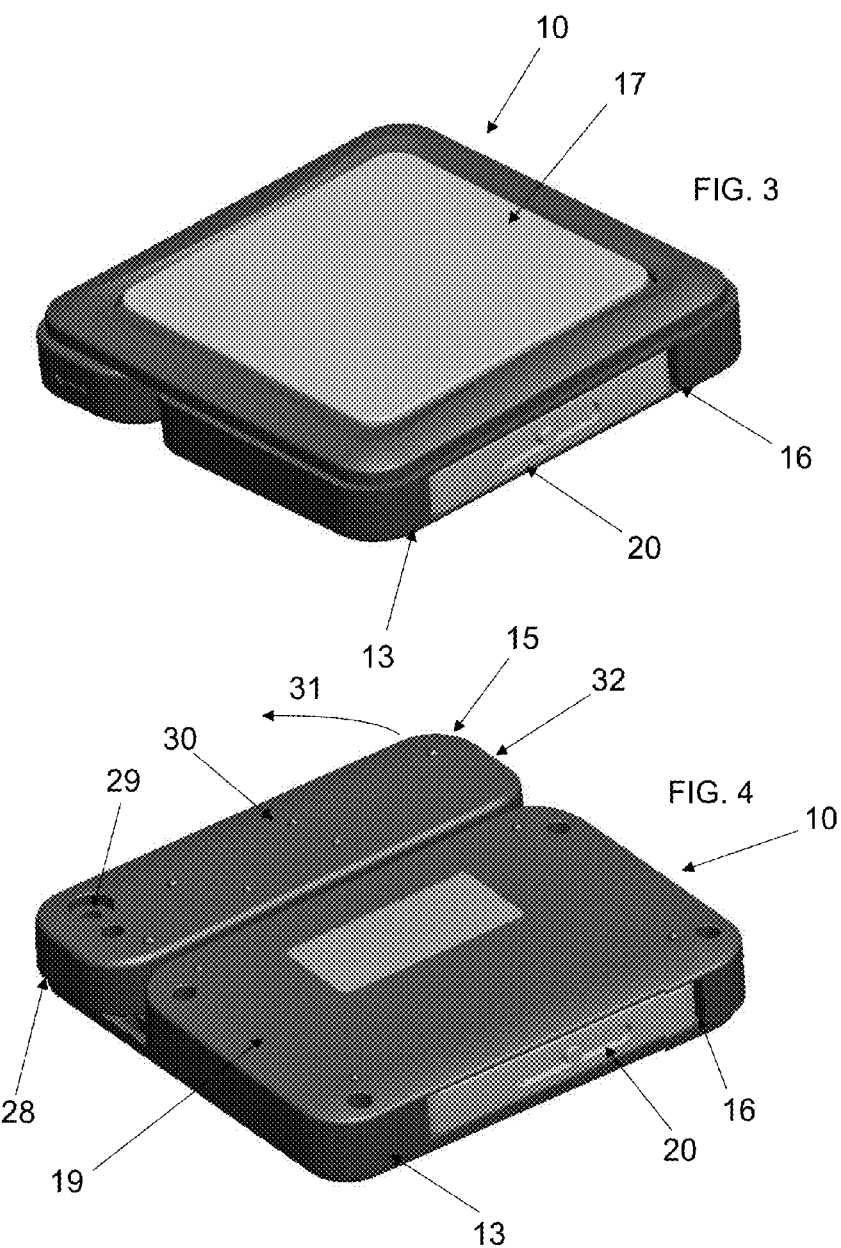

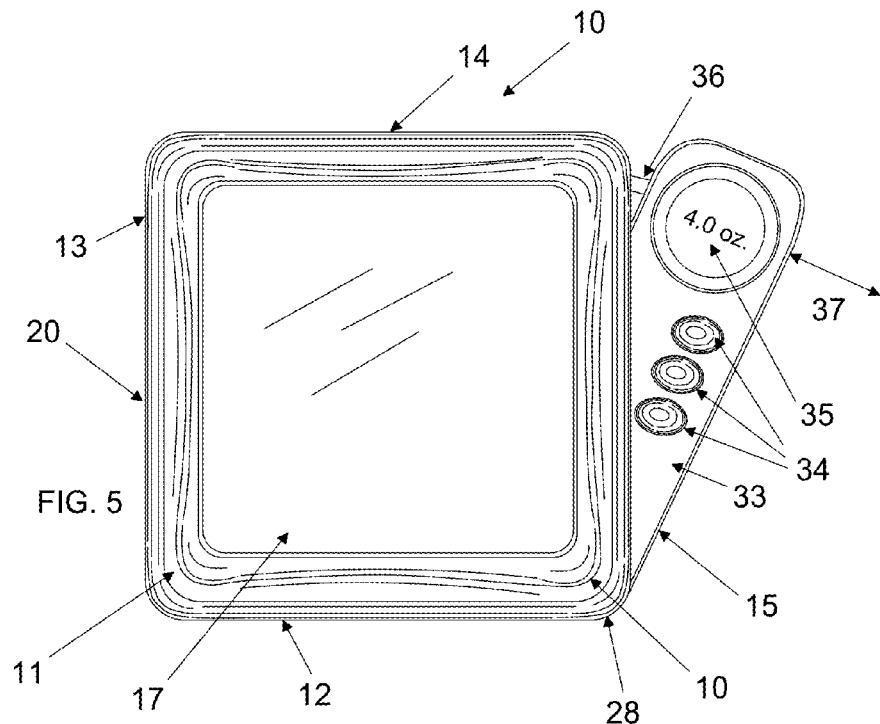
FIG. 5
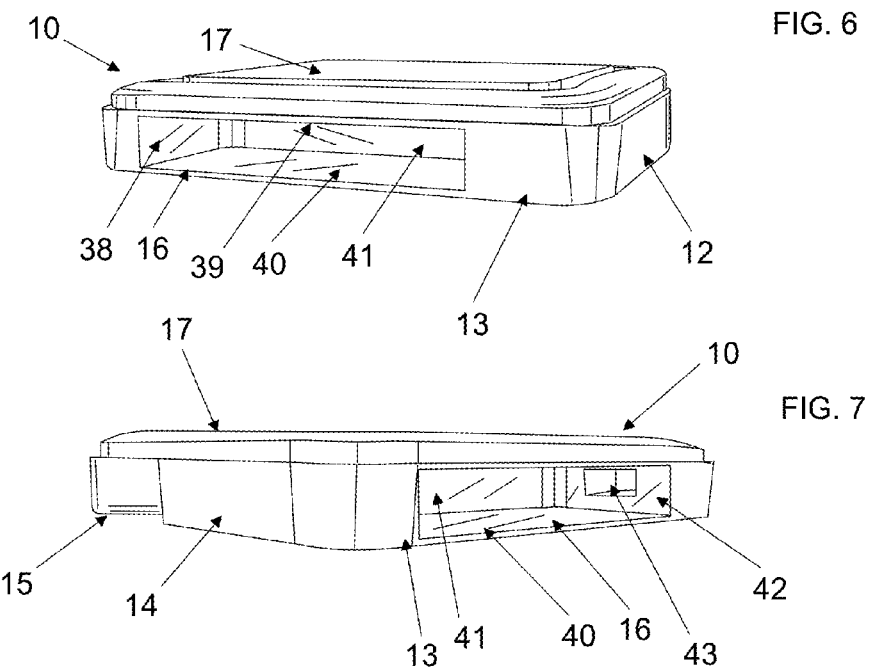
FIG. 6
FIG. 7

US 8,859,914 B1

DIGITAL SCALE WITH REMOVABLE INSERT

FIELD OF THE INVENTION

The present invention relates to digital scales, especially those comprising integral, removable parts.

BACKGROUND OF THE INVENTION

Digital scales are well known in the art, generally comprising a horizontal weighing surface supported in some manner from a load cell, which is operatively connected with a microprocessor, said microprocessor in turn being connected operatively to a user interface and a digital display. The load cell of an electronic digital scale can be made inexpensively and small so that, with the correspondingly small potential size of microprocessors, user interfaces (in the form of pressure sensitive buttons), and digital displays, allowing for a virtually unlimited forms and sizes of digital scales currently available. To protect the weighing surface from unintended impact, modern digital scales are often provided with either or both of a protective shield or casing for the weighing surface or an enclosure or box for the entire digital scale. Much design effort has been put into minimizing the size of the weighing surface, as well as a housing for the load cell and associated microprocessor, which usually includes a space for a battery for a power supply.

Digital scales are an important tool used by many in the business of diamond or precious metals to obtain accurate weights for their items of exchange or purchase. Items of such small weight generally imply a small size, requiring that a user engage with small items by way of fingers and/or manipulation tools in the form of forceps or tweezers.

Other users of small to mid-sized digital scales include a requirement to determine weights for postage of envelopes and small packages. A user will typically place their envelope or small package upon the weighing surface and then, by way of electronic and/or digital link or manually, translate the weight to a postage cost. An adjunct to the digital scales are items such as stamps, postage cost tables and data link cables from the digital scales to a local computer for transfer of a postage weight as an input to a postage cost software for generation of a shipping label or postage label which can be applied to an item of postage. Supplies for these shipping or postage labels is typically on a desktop adjacent to the digital scales and/or the local computer.

Still other users of small to medium digital scales are involved in gunsmithing and/or reloading, where extremely precise weight measurements can be required to determine, for example, the actual weight of gunpowder dispensed from a volumetric measuring means such as from a small cup or integral dispenser of a reloading device. Using an accurate digital ammunition scale is the only way to consistently hand-load ammunition with the same amount of propellant or gunpowder in every round. Those involved in pistol or rifle marksmanship competitions are typical users of such individual cups or volumetric containers for gunpowder.

In a category ultra-high precision scales are those whose users must determine weights of small volumes of chemical compounds and/or medications. Chemists and pharmacists regularly engage in such activities, regularly contacting the materials and/or their containers to be weighed only with adjunct metal or plastic tools to avoid adding a varying weight to the object to be weighed in the form of fingerprints or materials adhered to a user's fingers. Said adjunct tools, which may include small weighing containers such as small cups or dishes, are generally arrayed adjacent to the digital scales for easy access, but are then exposed to deposition of dust or airborne droplets and moisture.

Still other users must measure a weight of an herbal or spice ingredient, an incense mixture component, or a component of a cosmetic or skin treatment product. These are, without limitation, incorporated while cooking, cosmetics, natural medicines, and fragrances. While some herbal compositions are effective for treatment of external or internal human maladies, some are burned to deter insects or pests. Further, herbs are also incorporated into teas, vinegars, oils, and butters. Digital scales are a virtual necessity in measuring herbs for incorporation into a mixture or for solitary use, as dried herbs are typically quite expensive in light of substantial skill required to ensure preservation of a flavor for an ingested herb or an aroma for one which is ignited to result in incense smoke.

Further, some states have provided by their statutes legalized sales of marijuana. While the status of these state statutes is in question at the federal level, it is well known in Los Angeles County in California that over 150 medical marijuana dispensaries operate authorized under county license and state law. To the extent that federal law prohibits sale or use of marijuana, it is well known that medical marijuana is sold and used nationally legally under the laws of many states. Marijuana, being a dried herb, is in the category of being relatively valuable in small amounts, necessitating the use of high precision digital scales not only for production, packaging and sales, but also for the user who is self dispensing a medically prescribed material in small quantities per use. A medical marijuana user typically has unresolved pain or discomfort for which pain level and expected time for which it will last that user must determine an effective amount of a specific cultivar of marijuana that will be effective. Digital scales are pervasive to the production, packaging, sale and end use of medical marijuana. As medical marijuana is burned in a manner similar to tobacco, it is well known that an adjunct tool for the operations related to medical marijuana will be a means to ignite marijuana so that its smoke can be effectively inhaled by a medical marijuana user.

In the art of digital scales, it is well known that some smaller to midsized models incorporate battery power by way of replaceable or rechargeable batteries. It is further well known to remove such batteries for replacement and/or recharging. In this way, replaceable batteries or recharging means for rechargeable batteries are adjunct tools for the operation of digital scales related to medical marijuana.

There is a need for a digital scale that may provide for a user's incorporation into said scales of adjunct tools and, optionally, for a rechargeable battery.

SUMMARY OF THE INVENTION

The present invention is a digital scale having an outside housing that generally is supported from a support surface from a horizontal surface, where the outside housing preferably encloses a microprocessor operating under a control program and is at least connected to a power supply, a sensors/load cell unit, an input/output unit, and a user interface with a display. The sensors/load cell unit is operatively connected with a weighing surface plate, upon which may directly receive to an upper surface an item which will be weighed or which may engage other intervening plates or containers which ultimately support an item to be weighed. The outside housing defines an opening in a bottom, side or top surface which provides access to an adjunct tools container which lies, in a stored position, completely or mainly, within a form factor of the outside housing. The adjunct tools container can be releasably fixed or merely slidable between the stored position and an access position entirely or mostly outside of the form factor of the outside housing.

In the present invention, it is intended that adjunct tools which may be used in cooperation with the weighing function of the invention digital scale be stored or incorporated within the adjunct tools container and be accessible to a user of the invention digital scale.

In a simplest embodiment of the present invention, the adjunct tools container comprises a drawer, with or without a top or side cover to prevent adjunct tools from spilling from the adjunct tools container, which can be partly pulled open relative to an outside surface of a form factor of the outside housing. A storage cavity in this simplest embodiment provides for storage of small forceps, tweezers, cups, calibrating weights, weighing papers, and/or other items which a user of the invention digital scale may desire to store therein. A gem user may obtain from the storage cavity of the adjunct tools container in this simplest embodiment a pair of tweezers with which to pick up gems or small items of precious metals, thereby avoiding affecting the gem weight with the oils or moisture from a fingerprint or to avoid loss of a small gemstone. The same user may obtain a very light piece of weighing paper from the storage cavity of the adjunct tools container, place the piece of weighing paper upon the weighing surface of the digital scale, and thereafter dispense thereon an amount of precious metal powder, granules or pieces which are intended for later melting and forming into a piece of jewelry. A similar operation is intended for a user measuring small amounts of a medication or dried herb as described above. Such users may store sealed containers of precious metals, gems, medications and/or herbs within the storage cavity of the adjunct tools container.

In a power and storage embodiment of the present invention, at least a portion of the adjunct tools container incorporates either of a rechargeable battery (exemplified by the nickel cadmium (NiCd), nickel metal hydride (NiMH), lithium ion (Li-ion), or lithium ion polymer (Li-ion polymer) types) of sufficient capacity to power the digital scale or a transformer/rectifier assembly capable of transforming typical household voltage and current to that required for operation of the digital scale. As integral with the adjunct tools drawer, electrical contacts between either of the rechargeable battery or the transformer/rectifier assembly and the electrical circuits of the digital scale are capable of being engaged or disengaged depending on the location of the adjunct tools container relative to the outside housing. In an inserted position of the adjunct tools container, the rechargeable battery or the transformer/rectifier assembly are in electrical contact with the electrical circuits of the digital scale, whereafter the transformer/rectifier assembly is further connected by an electrical cord to a household electrical power outlet. In a removed position of the adjunct tools container, the rechargeable battery or the transformer/rectifier assembly are disengaged with electrical contact with the electrical circuits of the digital scale. The rechargeable battery comprises a plug structure for engaging a power source external to the digital scale for recharging the battery, including a plug for connection to household current or a USB connector for connection to a local desktop computer or laptop computer. The user of the digital scale in this embodiment may optionally power the digital scale by removable rechargeable battery or by removable transformer/rectifier assembly, which, as integrated into the adjunct tools container, also comprises additional storage space for adjunct tools or other devices. This embodiment provides for an adjunct tools container with removable storage space combined with removable power connection.

In a further form of the power and storage embodiment of the present invention, one or more electrically powered inserts or devices are incorporated into at least some of the remaining storage space of the adjunct tools container where the digital scale power supply is by way of rechargeable batteries, which are also incorporated therein. These electrically powered devices are chosen from any of several capable of operating by electrical connection with the rechargeable battery. One electrical device which is beneficially integrated with the rechargeable battery in the adjunct tools container is a resistance heating element which is capable of being exposed when the adjunct tools container is in the removed position and can then be heated to an ignition temperature for a smoldering ignition of incense or certain herbs or plant resins. Another electrical device which is beneficially integrated with the rechargeable battery in the adjunct tools container is a resistance heating element which is capable of being exposed when the adjunct tools container is in the removed position and can then be heated to an ignition temperature and which powers a small fan blowing across the resistance heating element to provide warm air in a direction desired by the user. Another electrical device which is beneficially integrated with the rechargeable battery in the adjunct tools container is a lighting device (such as an LED) which is capable of being exposed when the adjunct tools container is in the removed position to provide light to a local area for the user of the invention device. Another electrical device which is beneficially integrated with the rechargeable battery in the adjunct tools container is a digital processor and local display which is capable of being exposed when the adjunct tools container is in the removed position to provide any of several functions of small digital devices now currently available, such as a stopwatch/timer/calendar device or a small game playing device. For instance, a user might weigh components for cooking on the digital scale and then remove the adjunct tools drawing to set a timed alarm for their recipe cooking time. Another electrical device which is beneficially integrated with the rechargeable battery in the adjunct tools container is a laser pointer which is capable of being exposed when the adjunct tools container is in the removed position. Another electrical device which is beneficially integrated with the rechargeable battery in the adjunct tools container is a lighted magnifier (incorporating a lighting element such as an LED) which is capable of being exposed when the adjunct tools container is in the removed position to provide a user with the ability to examine a gem which has been weighed on the digital scale.

The foregoing description of electrical devices capable of being beneficially integrated with the rechargeable battery in the adjunct tools container is not intended to be a specific limitation in every instance but instead indicates that electrical devices whose function(s) are both relevant and not relevant to the materials being weighed may be made part of this invention embodiment.

BRIEF DESCRIPTION OF THE DRAWINGS

FIG. 3 is the digital scale and adjunct tool container of FIG. 2 with the adjunct tool container in an inserted position.

FIG. 4 is the digital scale and adjunct tool container of FIG. 2 shown from a bottom perspective view.

FIG. 5 is a top view of the digital scale and adjunct tool container of FIG. 3 with a rotatable arm shown in the opened position, showing user interface buttons and a display screen.

FIG. 6 is a right and side view of the digital scale of FIG. 2, showing a cavity adapted to receive the adjunct tool container.

FIG. 7 is a left and side view of the digital scale of FIG. 2, showing a cavity adapted to receive the adjunct tool container.

DETAILED DESCRIPTION OF THE INVENTION

The invention is now discussed with reference to the figures.

Figure 1:
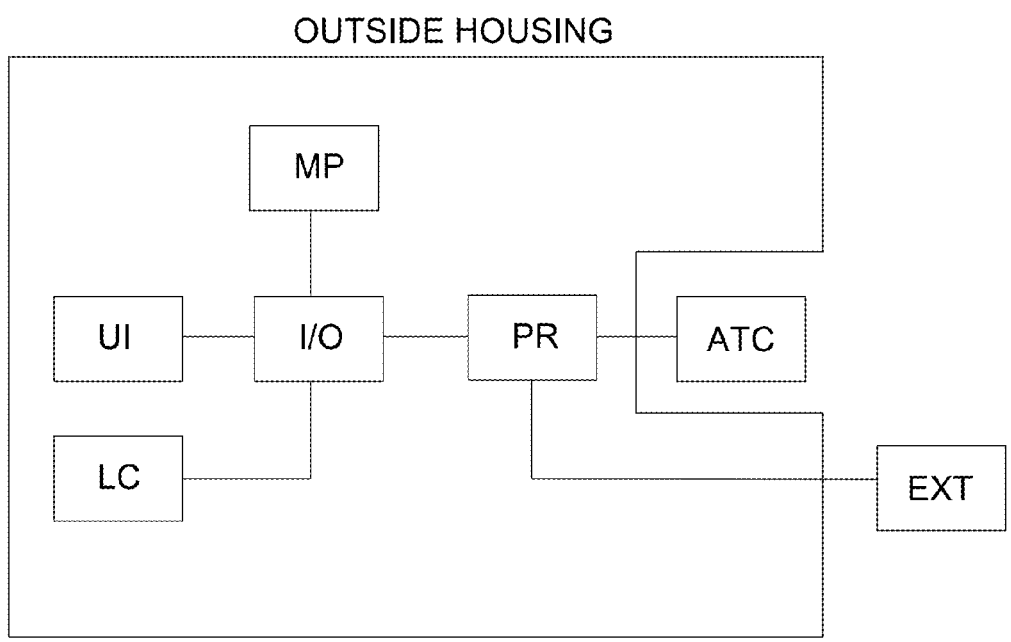
FIG. 1 is a high level diagram of the invention system of a digital scale and an adjunct tool container.

FIG. 1 is a high level diagram of the invention system of a digital scale showing an outside housing OH generally enclosing and supporting a microprocessor MP, which is connected with an input/output unit I/O. Unit I/O is connected with a user interface UI (which comprises pressure sensitive buttons and a display for weighing operations of the digital scale), one or more load cells LC (which are in turn operatively connected with a weigh surface), and a power regulator PR. Power regulator PR contains well known means for input and output of electrical power to the connected elements shown to accomplish the objects of the invention, it being understood that the separate elements shown in outside housing OH are often combined for efficiency and/or cost savings. An adjunct tool container ATC is shown having an electrical connection with power regulator PR through the outside housing OH, through which external electrical power source EXT is also shown with such electrical connection. Source EXT is capable of being disconnected from the invention digital scale, whereafter in one form of the invention system a rechargeable battery incorporated in the removable adjunct tool container ATC then provides electrical power to the digital scale. In another form of the invention, source EXT is connected with power regulator PR, which then detects that a rechargeable battery incorporated into adjunct tool container ATC requires charging and directs electrical power thereto for recharging. Alternately, adjunct tool container ATC may be disconnected from the invention digital scale and have its rechargeable battery re-charged from another external electrical power source. The electrical connection of the adjunct tool container ATC is optional in the present invention, in that the adjunct tool container may serve the function of storage only without electrically powered devices or electrical power storage devices.

Figure 2:
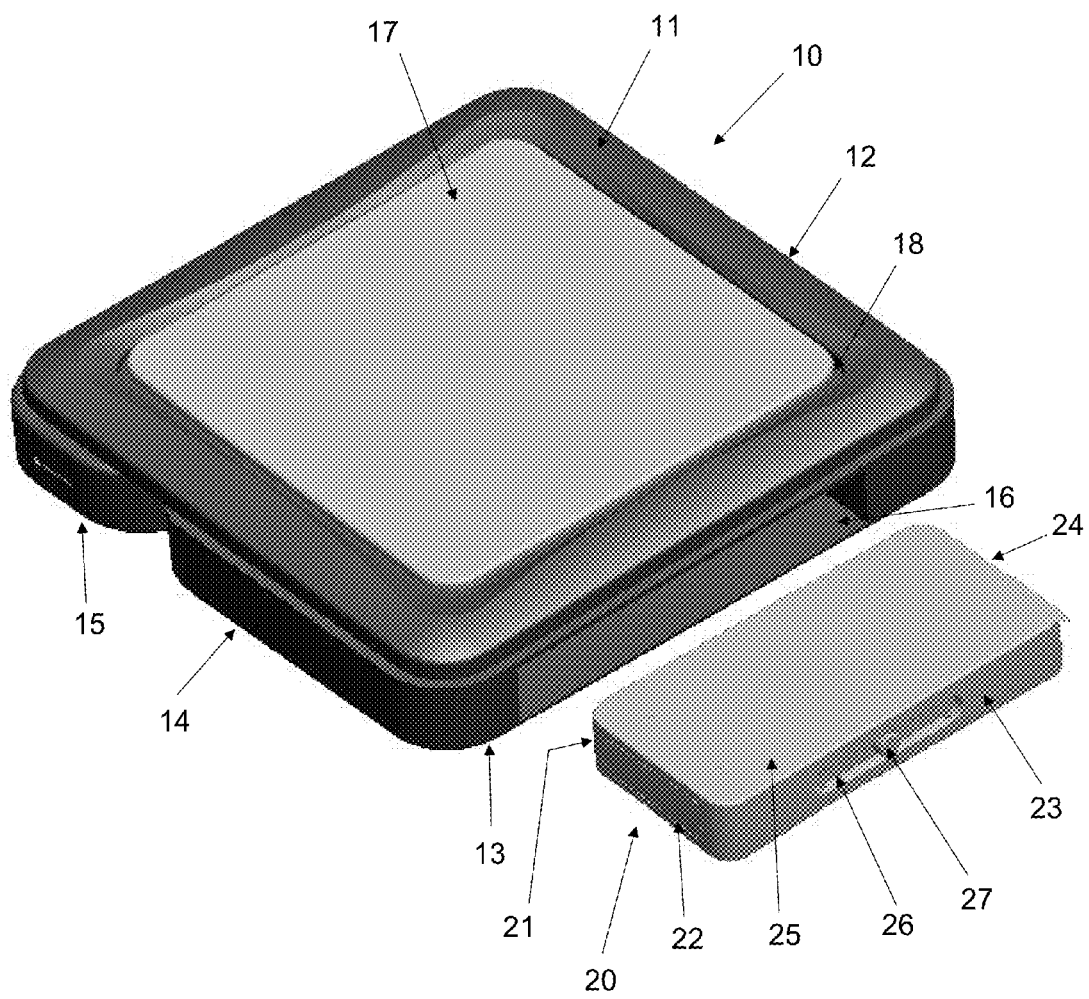
FIG. 2 is a top perspective view of a digital scale adapted to receive an adjunct tool container, which is shown in a removed position.

FIG. 2 is a top perspective view of an invention digital scale 10 adapted at cavity 16 formed inward from sidewall 13 to receive an adjunct tool container 20, which is shown in a removed position. Scale 10 comprises an outside housing comprising two separated parts, a rotating arm part 15 and a main part having a top surface 11 surrounding a weigh surface 17 (with space 18 separating them), and other sidewalls 12 and 14. Cavity 16 is adapted to closely couple with the form factor of adjunct tool container 20, which comprises sidewalls 21, 22, 23 and 24. Sidewall 23 defines a slot 26 which allows for button 27 to be moved back and forth within it to cause an extensible slider piece to extend out from sidewall 24, thereby resulting in secure engagement of adjunct tool container 20 through a right sidewall of cavity 16, as shown in FIG. 3 with the adjunct tool container 20 with the adjunct tool container in an inserted position within the form factor of the outside housing as described above.

FIG. 4 is the digital scale 10 and adjunct tool container 20 of FIG. 2 shown from a bottom perspective view, where a rotating arm part 15 is shown to have a separate housing from the main outside housing comprising a rear part 32, a front part 28 and a bottom 30, where pivot pin 29 is adapted to allow short travel of rear part 32 to travel along path 31 to show the user interface of FIG. 5. In FIG. 5, a top 33 comprises a number of pressure sensitive buttons 33 and a user visible display screen 35 to observe results of weighing using the digital scale, where such user interface is electrically connected with components in the main outside housing of the invention digital scale, although it within the objects of the invention to have only a single main outside housing supporting such a user interface. Travel path 37 shows the directions the rotating arm part 15 takes in moving from a closed to open position and a return to the closed position enabled by a bar 36.

FIG. 6 is a right and side view of the digital scale 10 of FIG. 2, showing a cavity 16 comprising a floor 40, left sidewall 38, rear wall 41 and ceiling 39. In FIG. 7, a right side wall 42 is shown defining an opening which extends into an interior of the outside housing to form a generally rectangular structure 43 which is adapted to receive a portion of the extensible slider piece previously described.

Figure 8:
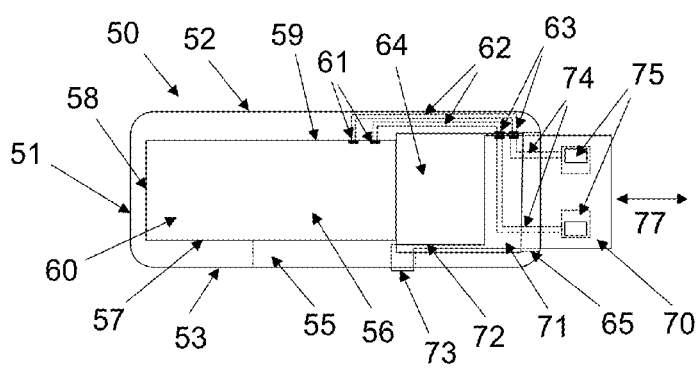
FIGS. 8, 9, and 10 are respectively top, right end, and outer side views of an open top form of the invention adjunct tool container.
Figure 9:
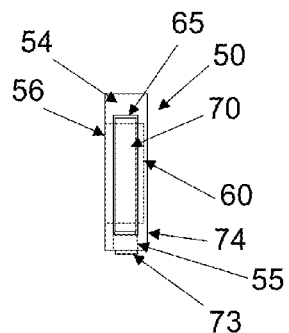
Figure 10:
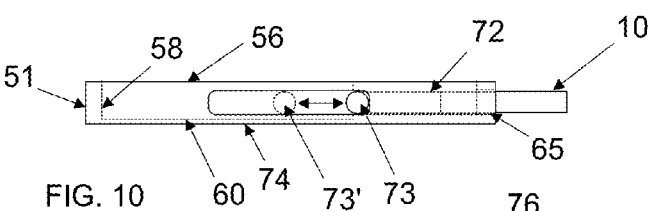

One form of the invention adjunct tool container 20 is shown in FIGS. 8, 9 and 10 comprising sidewalls 51, 52, 53 and 54 and an open top drawer structure in general, adapted to receive and/or dispense adjunct tools in a space 56 defined by sidewalls 57, 58 and 59 and floor 60. Extensible slider piece 70 is adapted to slide back and forth along path 77 so that, in an extended position section 71 is retained and guided outward through and in a rectangular slot 65 in sidewall 54. FIGS. 8, 9, and 10 are shown with piece 70 in the extended position, where a user may contact and push button 73 to the left in slot 55, thereby, through arm 72, causing the entire piece 70 to be retracted into space 64. The portion of piece 70 shown extended in FIGS. 8, 9, and 10 is adapted to be inserted into structure 43 of FIG. 7, thereby securely engaging adjunct tool container 20 within the form factor of the outside housing of the digital scale 10.

In other embodiments of the adjunct tool container 20, piece 70 can be eliminated to provide a simple drawer with a flange along sidewall 53 so adjunct tool container 20 can be inserted and removed from cavity 16 of FIG. 7, whereby a latch, pin or other securing device can prevent accidental spilling of adjunct tool container 20 from cavity 16.

FIGS. 8, 9, 10, 11 and 12 disclose an electrically powered embodiment of adjunct tool container, where piece 70 comprises exposed electrical contacts 75. Electrical contacts 75 are adapted to connect with electrical circuits of the digital scale 10 when piece 70 is extended to be inserted into structure 43 of FIG. 7. Exposed electrical contacts 75 extend with piece 70 by conductors 74 to contact interface 63, whereafter conductors 62 extend along sidewall 52 to contact interface 61, thereby providing for electrical connection from digital scale 10 to space 60. It is an object of the invention to provide electrical powered devices as described above within space 60 so as to be electrically connected with digital scale 10. While the present drawing figures show specific examples of a particularly advantageous arrangement of electrical connection and secure engagement of the adjunct tool container 20 within a cavity 16 of the form factor of the outside housing of the present invention, these are not limiting as to the range of equivalents which will be apparent to those skilled in the art with disclosure of the present invention.

Figure 11:
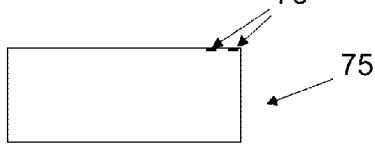
FIG. 11 shows a powered insert adapted to be lodged and secured in the adjunct tool container of FIG. 8.
Figure 12:
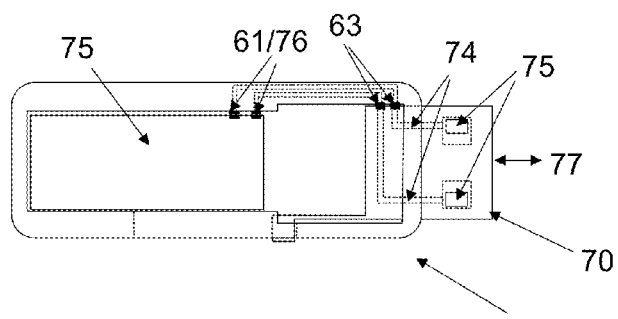
FIG. 12 shows the powered insert of FIG. 11 inserted in the adjunct tool container of FIG. 13.

Referring now to FIG. 11, an electrically powered insert 78 is shown as a generally rectangular shape adapted to be secured within space 60 so that its contacts 76 are engaged to contacts 61, as shown in FIG. 12. Further, this specific and non-limiting example for FIGS. 8, 9, 10, 11 and 12 show that moving piece 70 to a retracted position along path 77 results in breaking of contacts 63, so that electrically powered insert 78 is disconnected from electrical contact with digital scale 10. In a simple example, insert 78 is a rechargeable battery.

Figure 13:
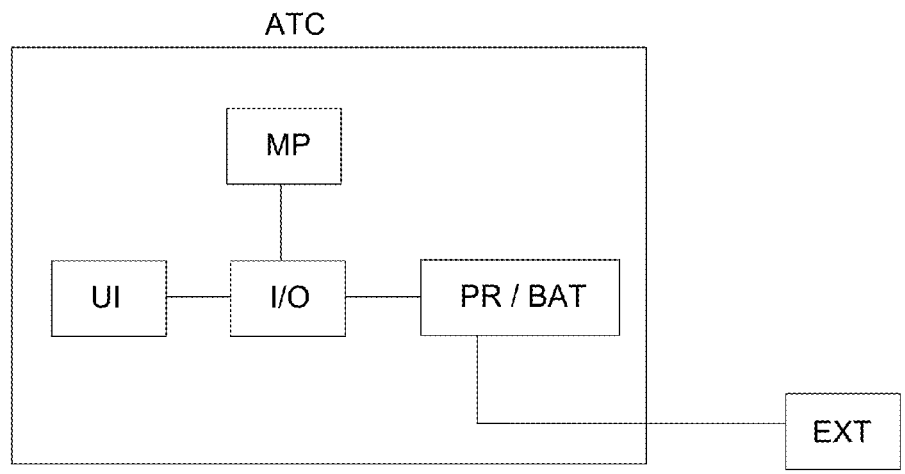
FIG. 13 is a high level diagram of the invention powered insert for an adjunct tool container.

FIG. 13 is a high level diagram of the invention powered insert for an adjunct tool container ATC with optional configurations. In one such configuration, an external power source or a digital scale electrical connection EXT is removably connected with a power regulator or battery PR/BAT, which is a rechargeable battery only in some forms of the invention. Optionally, a microprocessor MP1 may be connected by an input/output unity I/O1 to power regulator or battery PR/BAT, which then may provide or accept respectively outputs or inputs of a user interface UI1. FIG. 13 describes a general structure by which may be obtained the functions of the electrically powered devices or inserts described above.

Figure 14:
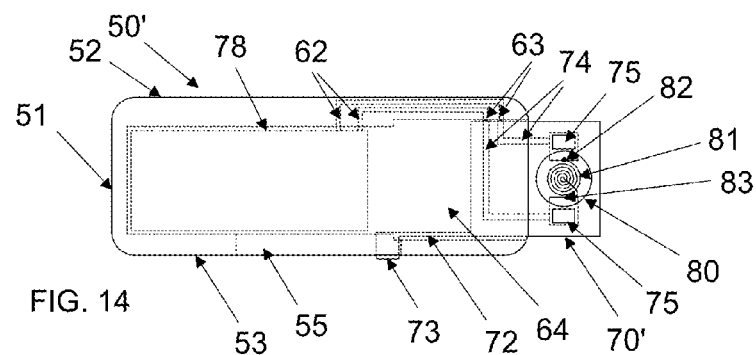
FIG. 14 is a top view of a closed top form of the invention adjunct tool container, showing a resistance heating element incorporated into an extensible slider piece in the extended position.
Figure 15:
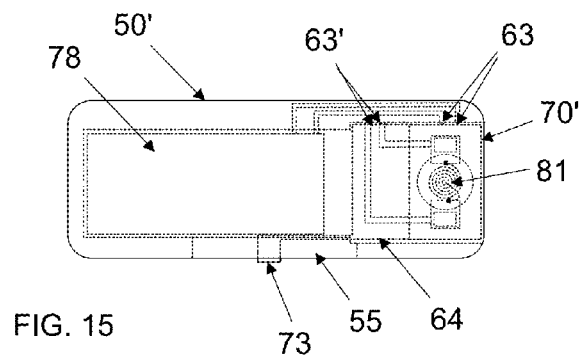
FIG. 15 is the closed top form of the invention adjunct tool container with the extensible slider piece shown in the retracted position.

FIG. 14 is a top view of a closed top form of the invention adjunct tool container 50', where no open top is provided but instead is generally sealed as shown for adjunct tool container 20 in FIG. 2. adjunct tool container 50' of FIG. 14 shows a resistance heating element 81 incorporated into an extensible slider piece 70' in the extended position. Element 81 comprises a very high resistance conductive spiral electrically and structurally connected across opening 80 across a gap between contacts 75. As insert 78 is a rechargeable battery with means for power regulation to element 81, adjunct tool container 50' is adapted to cause element 81 to become heated to a temperature sufficient to smolderingly ignite vegetable matter such as herbs or tobacco. A user can cause said heating to cease by way of retracting piece 70' within the body of adjunct tool container 50' as shown in FIG. 15.

The above design options will sometimes present the skilled designer with considerable and wide ranges from which to choose appropriate apparatus and method modifications for the above examples. However, the objects of the present invention will still be obtained by that skilled designer applying such design options in an appropriate manner.

I claim:

1. A digital scale having electrically powered circuits and with an outside housing generally enclosing a microprocessor and one or more load cells connected with the microprocessor and a weigh surface, where the microprocessor controls and receives inputs from a user interface, the improvement comprising:
    (a) the outside housing defining an outside wall form factor and an adjunct tool container cavity inward from said outside wall form factor, which adjunct tool container cavity is adapted to supportively receive an adjunct tool container;
    (b) the adjunct tool container comprising an open top or closed top drawer structure for containing one or more adjunct tools, where the drawer structures are adapted to be releasably secured within said adjunct tool container cavity in a stored position and to be removed from the said adjunct tool container cavity in a removed position;
    (c) the open top drawer structure comprises tool electrical contacts which are connected with electrical circuits of the digital scale when in the stored position;
    (d) an electrically powered insert is removeably fixed within a drawer space of the adjunct tool container and has electrical contact with the tool electrical contacts; and
    (e) the electrically powered insert is a rechargeable battery which is recharged only from electrical power supplied from the electrical circuits of the digital scale, which, in turn receives electrical power from an external source; and
    (f) an engagement structure cavity further extends inward relative to the adjunct tool container cavity and is adapted to receive an extended end of an extensible slider piece of the adjunct tool container.

2. The digital scale of claim 1 wherein the extensible slider piece comprises the tool electrical contacts upon the extended end and which electrically connect the adjunct tool container to the digital scale when in an extended position.

3. The digital scale of claim 2 wherein the extensible slider piece comprises the tool electrical contacts upon the extended end and which break electrical connection of the adjunct tool container to the digital scale when moved to a retracted position.

4. The digital scale of claim 3 wherein the electrically powered insert comprises an electrically powered heating element.

5. The digital scale of claim 4 wherein the electrically powered heating element is supported from and directly electrically connected with the tool electrical contacts.

6. A digital scale having electrically powered circuits and with an outside housing generally enclosing a microprocessor and one or more load cells connected with the microprocessor and a weigh surface, where the microprocessor controls and receives inputs from a user interface, the improvement comprising:
    (a) the outside housing defining an outside wall form factor and an adjunct tool container cavity inward from said outside wall form factor, which adjunct tool container cavity is adapted to supportively receive an adjunct tool container;
    (b) the adjunct tool container comprising an open top or closed top drawer structure for containing one or more adjunct tools, where the drawer structures are adapted to be releasably secured within said adjunct tool container cavity in a stored position and to be removed from the said adjunct tool container cavity in a removed position;
    (c) the open top drawer structure comprises tool electrical contacts which are connected with electrical circuits of the digital scale when in the stored position;
    (d) an electrically powered insert is removeably fixed within a drawer space of the adjunct tool container and has electrical contact with the tool electrical contacts;
    (e) the electrically powered insert is a rechargeable battery;
    (f) an engagement structure cavity further extends inward relative to the adjunct tool container cavity and is adapted to receive an extended end of an extensible slider piece of the adjunct tool container;
    (g) the extensible slider piece comprises the tool electrical contacts upon the extended end and which electrically connect the adjunct tool container to the digital scale when in an extended position;

(h) the extensible slider piece comprises the tool electrical contacts upon the extended end and which break electrical connection of the adjunct tool container to the digital scale when moved to a retracted position; and (i) the electrically powered insert comprises an electrically powered heating element.

* * * * *